Oct. 25, 1938.  W. HIEMANN  2,134,124
HARD RUBBER ARTICLE AND METHOD OF PRODUCING SAME
Filed April 23, 1937
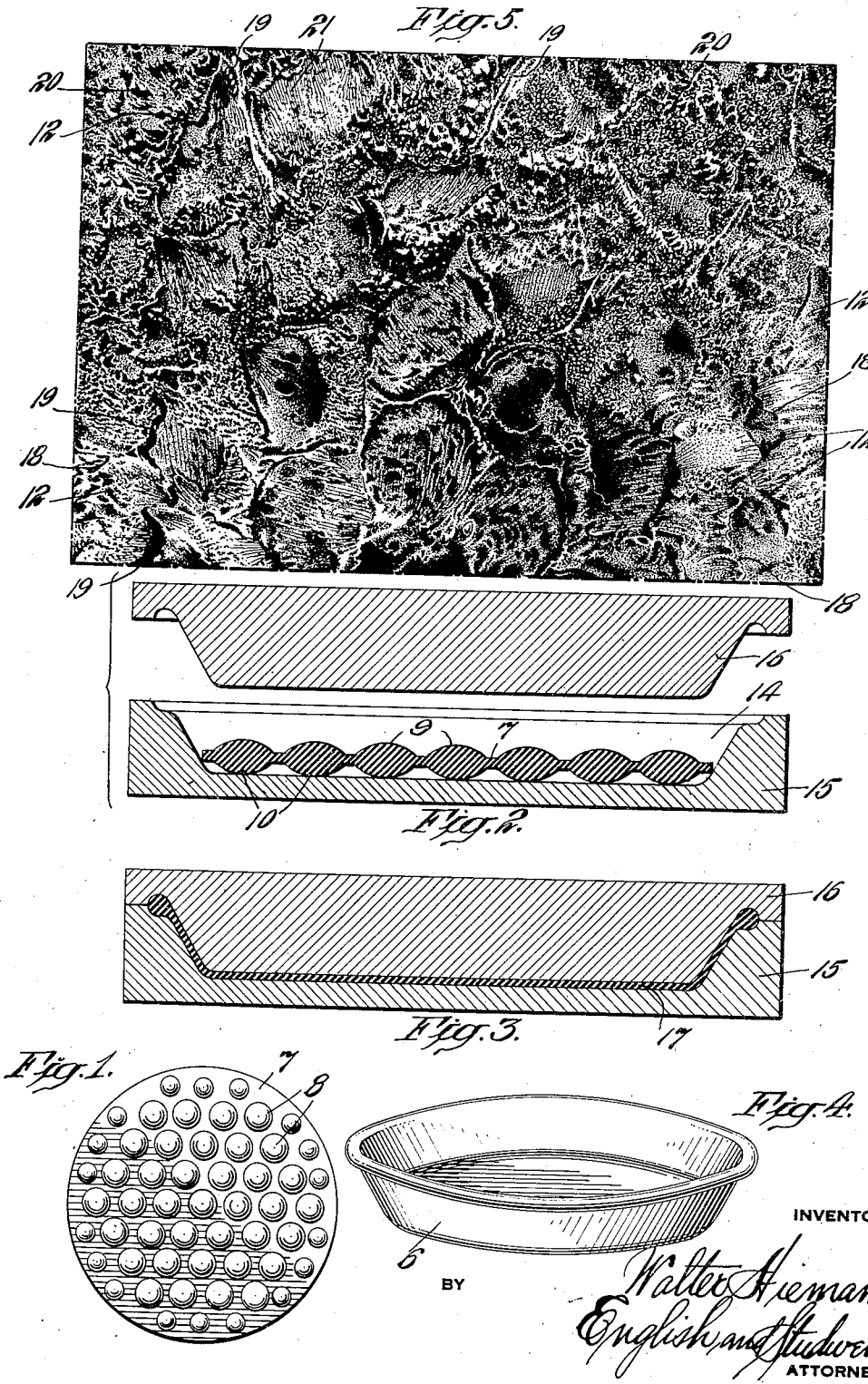
INVENTOR
Walter Hiemann
English and Studwell
ATTORNEYS

UNITED STATES PATENT OFFICE 2,134,124

HARD RUBBER ARTICLE AND METHOD OF PRODUCING SAME

Walter Hiemann, New York, N. Y., assignor to American Hard Rubber Company, New York, N. Y., a corporation of New York Application April 23, 1937, Serial No. 138,571

6 Claims. (Cl. 18—61)

This invention relates to an improvement in hard rubber articles and to a method of producing same, and more particularly to an improvement in molded, colored hard rubber articles and to a novel method of producing same.

Heretofore in the manufacture of hard rubber articles of various kinds, having a smooth or rough exterior surface, whether produced by molding, calendering, extruding or by other action, the material composing the exterior surface of the hard rubber article has presented a continuous, unitary appearance, the material composing the surface being homogeneous in structure with the immediate underlying material. All portions of the surface or surfaces of such hard rubber articles, whether lying in the same plane or in a rounded surface, reflect light with the same degree of intensity while the article remains in a fixed position but is viewed from different angles, or is viewed from a fixed point while being turned or rotated. This phenomenon has been observed to hold regardless of the color of the hard rubber article, whether black, red, green, yellow, or other color, or a combination of two or more colors, such as a mottled color resulting from mixing or combining black and red, and also whether the surface of the article is smooth and polished, or smooth but dull and without polish. That is to say, colored hard rubber articles, as heretofore produced, always exhibit the same shade of color when viewed under specific conditions.

The surfaces of such substances as nacre or mother-of-pearl, on the contrary, as is well known, reflect and/or refract light with different degrees of intensity, and also present different colors, according to the angle of observation, even when the surface of the mother-of-pearl remains in the same plane. This phenomenon has been explained to be caused by the surface of the nacre interfering with or breaking up the light rays, assuming that the light is white light. It has long been sought in the manufacture of relatively small articles, such as those serving toilet, household and similar uses, to produce these articles from substances the surfaces of which will resemble or give a mother-of-pearl effect, or light effects similar thereto, with or without the iridescence of mother-of-pearl. Such results have been produced on the surfaces of articles composed of thermoplastics or the derivatives of rubber and cellulose and of other substances. But up to the present invention, however, so far as I am aware, this mother-of-pearl, or light interfering or reflecting effect has not been produced on the surfaces of hard rubber articles. The explanation seems to be that the material composing the surface of a hard rubber article, and more especially the smooth surface of a molded hard rubber article having rubber, pigment and other particles uniformly distributed therethrough is a continuous, amorphous or non-crystalline substance. Hence all parts of the exterior surface of a hard rubber article as heretofore produced always present the same shade in color or light reflection under a given condition.

I have discovered that a large variety of novel light and shade effects can be produced on the surfaces of molded hard rubber articles, even light effects resembling those, but without iridescence, of nacre. These novel light and shade effects are produced by means of a novel hard rubber composition and a novel method of molding it into final form. The hard rubber composition, to produce the most pleasing light and shade effects, should contain in addition to the usual ingredients of a hard rubber compound, an arsenic sulphide, such as the trisulphide, orpiment ($As_2S_3$), the disulphide, realgar ($As_2S_2$) or the pentasulphide ($As_2S_5$). The novel hard rubber composition is preferably preformed as an intermediate product in a shape different from that of the final article and is precured in that state, either partially or fully precured or vulcanized. This intermediate product may present a continuous uninterrupted exterior surface, or it may have a plurality of separated areas. To form the final molded hard rubber article, the intermediate product may be used whole, or it may be cut up into relatively small pieces and crumbs, or if it possesses separated areas it may be used in that condition. A necessary condition in producing the final article is that the intermediate product be stretched or distorted under pressure and then finally vulcanized in that condition. I have found that the most pleasing light and shade effects on the surface of the novel molded hard rubber article are given by such surfaces as consist of a plurality of separate but coalesced areas.

The different surface areas of colored hard rubber articles containing an arsenic sulphide and produced according to the new method will vary in shade or intensity of light reflection depending on the angle from which the article is viewed, and present pleasing novel designs, with different light and shade effects enhancing the appearance of the article. The surfaces of such articles will also, according as the modifications of the invention are practiced, present light effects resembling those of mother-of-pearl, although no iridescence is produced, that is to say, the surface of the novel hard rubber article will possess a lustre or "depth", or apparent translucidity not heretofore produced on the surface of hard rubber articles.

These novel light and shade effects on the surfaces of the hard rubber article produced by the present invention are apparent by observing the article from a fixed position and turning or rotating the article so that its surface turns in the same plane, thereby assuring that the ray of light falling upon the article is of uniform intensity and falls on the part of the article in line with the eye of the observer. The same phenomenon is also apparent when the article is observed from different angles, and also when the article is observed from a fixed position and the surface of the article is moved into different planes. In the preferred form of the invention, the arrangement of the component parts of the surface of the article is such that the different, distinct areas of the surface of the article present different shades of the color of the article or different degrees of light reflection when viewed from a fixed point. These different shades change from light to dark and from dark to light as the angle of view is changed.

The molded hard rubber articles of the present invention may be variously colored according to the variations of the pigment ingredients of the compositions used. A rich yellow will be imparted to the hard rubber article by using only one of the arsenic sulphides. A deep and pleasing green will be imparted to the article by mixing one of the arsenic sulphides with an inorganic blue, such as ultramarine. An article with a reddish color is produced by mixing an arsenic sulphide with a suitable red pigment, such as lithol red or iron oxide. A great variety of other colors and shades of colors may be produced on the surfaces of the various distinct areas of the novel hard rubber article by combining any of the pigments given above with other coloring materials, whether organic or inorganic. It should be observed, however, that in order to produce light reflecting effects most nearly resembling that of nacre or mother-of-pearl, that is to say, a luster or an illusion of translucidity comparable with the light effects of mother-of-pearl, preferably one of the arsenic sulphides should be employed, and that if any other color than yellow is desired, the additional coloring matter should not react with the arsenic sulphide in such a way as to destroy its property of producing an appearance resembling mother-of-pearl, it being understood of course that this mother-of-pearl effect is in shades of the color of the article and does not have the iridescence of nacre. Besides arsenic sulphide, I may also use aluminum bronze or magnesium bronze powder.

According to the design desired on the surface of the final molded article, the shape of the precured stage of the hard rubber compound or intermediate product will be varied. A plurality of pieces of the preliminarily or partially vulcanized hard rubber compound may be placed in the mold, whether the latter is composed principally of plane surfaces or is rounded, or is a combination of plane and rounded surfaces. I have followed various procedures of shaping the preliminarily cured hard rubber compound, depending upon the effect desired in the finished article. One way is to calender a sheet of the novel hard rubber compound, place it between metal slabs, which may conveniently be tin, and then subject the hard rubber compound to vulcanizing conditions, such as steam at 50 to 55 pounds pressure for about 10 minutes, or steam at 30 pounds pressure for about 25 minutes. This preliminary curing of the hard rubber compound produces a soft, readily moldable and stretchable intermediate product, but one in which the rubber particles are attached to each other by vulcanization firmly enough to hold in place the filler ingredients, such as the pigments, so that they will aline or orient themselves with the rubber particles when the latter are stretched, expanded or distorted during the second molding operation. The preliminarily cured hard rubber sheet is then cut into pieces or torn into crumbs and methodically arranged in or haphazardly thrown into the mold cavity in such a way that the material is caused to stretch or distort (preferably to the order of 100% or more), and flow into the empty spaces of the mold cavity. By applying pressure, all the pieces, as well as crumbs, will be squeezed out laterally, and in other directions, and thereby stretched or distorted, some of the underlying pieces or crumbs being forced up between the pieces contacting with the mold surfaces, the squeezing action of the mold continuing until the mold cavity is completely filled with the stretched and/or distorted intermediate hard rubber product. The mold and its contents are then placed in a vulcanizer, or preferably in a steam press, and subjected to steam heat at a temperature of about 360° F. for about 15 to about 30 minutes, thereby causing the various portions or pieces of the partially cured hard rubber compound which have been squeezed together in a great diversity of ways and directions to amalgamate and coalesce at their points of contact, after which they are hardened or vulcanized into a unitary whole in their stretched or distorted condition. Before removing the mold from the steam press or vulcanizer it is preferably cooled so as to avoid blistering of the surface of the vulcanized article. When the article has been removed from the mold and its exterior surface polished it presents the novel effects described above.

A convenient method of stretching and distorting the preliminarily vulcanized hard rubber composition is by first molding a piece of the novel hard rubber composition, with a plurality of spaced bosses or protuberances of various shapes and heights on one or both surfaces thereof. For example, if it is desired to produce a circular tray with raised edges, I make first a disk, having spaced bosses or protuberances thereon, the whole being voluminous enough to fill completely the cavity of the mold producing the tray. This disk with its protuberances is preferably molded, and cured in the mold to a satisfactory vulcanized state. The diameter of the disk should be at least 50% smaller than the diameter of the tray. The protuberances on the surface or surfaces of the disk are preferably spaced far enough apart so that when the disk is undergoing pressure in the final mold and the protuberances are being flattened out by stretching or lateral movement, portions of the flat disc will be forced between the protuberances, thereby separating the areas, resulting from the flattening of the protuberances, by relatively narrow strips which present in the finished article the appearance of having been stretched or distorted.

In producing a colored hard rubber article of present commercial manufacture, the ingredients commonly employed are rubber, sulphur, hard rubber dust, an accelerator activator, and a pigment, with or without other coloring matter. When these ingredients have been properly mixed, the mixture is calendered, molded, extruded or otherwise suitably shaped and then vulcanized in a steam press or closed chamber. An unvulcanized hard rubber composition is substantially self-sustaining, but is plastic to such degree as to be fluent, readily flowing under pressure into the cavities of the mold without stresses in the material, much the same as a liquid fills a cavity without stresses between the molecules of the liquid. In other words, the usual colored hard rubber composition prepared for molding is so fluent that when the parts of the mold are brought together on the lump of hard rubber composition, the pressure exerted by the mold parts on the composition forces all parts of the composition readily into the cavities of the mold without stretching or distortion of the particles of the hard rubber composition. Hence when the article while still in the mold is vulcanized, it is substantially amorphous, all the parts thereof occupying substantially the same relation to each other as they did in the unvulcanized state.

This amorphous or non-crystalline arrangement of the evenly dispersed particles of molded, vulcanized hard rubber compounds, as heretofore produced, accounts, as suggested above, for the absence of different light and shade effects on the surfaces of molded hard rubber articles, whether or not they contain as pigments the arsenic sulphides or other pigments, depending on the color effects desired. The light and shade effects of the different portions or areas of the surfaces of the colored hard rubber articles produced according to the present invention, are believed to be accounted for by giving the compound of the hard rubber article a preliminary cure thereby knitting the hard rubber particles tightly together and putting the compound in a stretched or distorted condition and vulcanizing the article in that condition. As the precured compound is not only stretched at the surface of article but also throughout the entire mass of compound these light effects will appear also after mold surface of article is turned or ground off and polished.

The accompanying drawing indicates diagrammatically the principal steps of producing the novel hard rubber article of the invention, a portion of which is also shown: Fig. 1 is a plan view of one form of the precured or intermediate product from which the finished colored hard rubber article, such as the tray shown in Fig. 4, may be produced; Fig. 2 is a longitudinal vertical section through a mold for producing the tray, the mold being shown in open position with the precured material therein; Fig. 3 is a view similar to Fig. 2, but showing the mold closed at the end of the molding operation with the rubber compound fully occupying the mold cavity; Fig. 4 is a perspective view of a serving tray produced from the precured material shown in Fig. 1; and Fig. 5 is a plan view on an enlarged scale, relatively to the other figures, of a section of the bottom of the tray shown in Fig. 4, illustrating by means of stiple and lines the different shades of the color of the bottom of the tray as viewed from a fixed point.

The improved hard rubber article is preferably composed from a novel composition. This composition may include the usual proportions of rubber, sulphur, accelerator, activator, anti-oxidant, or other usual ingredients of hard rubber compositions, with or without one or more of the usual pigments, and an arsenic sulphide, such as the disulphide or trisulphide. A formula resulting in a satisfactory colored hard rubber article may be composed as follows:—

|  | Parts by weight |
|---|---|
| Rubber | 56 |
| Sulphur | 28 |
| Arsenic trisulphide ($As_2S_3$) | 16 |

In converting this mixture of ingredients into the improved colored hard rubber article of the present invention, several variations of the preliminary steps of the improved process, as stated above, may be followed. In one embodiment the mixture of ingredients may be reduced to self-sustaining form in the shape of a slab or sheet as by means of a calender and then the slab precured or preliminarily vulcanized between platens, after which the precured slab or sheet may be cut into small pieces and crumbs and placed haphazardly or in orderly arrangement in the mold for giving the composition the ultimate shape of the colored hard rubber article. By using this embodiment of the preliminary steps of the improved process the pieces of precured material may be cut to any desired shape so as to produce any desired pattern or mosaic effect on the surface of the novel colored hard rubber article.

An expeditious method is to calender the mixture of ingredients and then place the slab or sheet of calendered material in a mold to produce a single intermediate product of different shape from the final article and which may be precured or vulcanized in the mold in which it is formed. To produce a tray such as that indicated in perspective at 6 in Fig. 4, having a surface composed of a plurality of distinct areas, as indicated in Fig. 5, it is convenient to first produce the intermediate product in the shape indicated by the disk shown at 7 in Fig. 1. Either or both the top and bottom surfaces of this disk 7 may be provided with the bosses or protuberances indicated at 8. The bosses 8 may be flat topped, rounded or serrate, or of other shape according to the effect desired on the surface of the article.

The preliminary curing or vulcanization of the intermediate product, whether in sheet form between platens or in disk or other form in a mold, is effected by steam, hot air or water for about 10 minutes, at a temperature of about 300° F.

The precured material, whether in separate pieces, or in a single piece with bosses or protuberances thereon, as shown in Fig. 1, is then placed in the mold designed to give the colored hard rubber composition its ultimate form. Assuming that it is desired to produce a shallow tray, such as that illustrated in Fig. 4, a form of tray finding extensive use in households, restaurants and cafeterias for the conveyance of food and liquids, the arrangement of the portions or pieces of the precured material in the mold should be such that in filling the cavities of the mold the material must be stretched and squeezed in all directions, sufficient material being placed in the mold to fill it completely. In order to produce to the highest degree the novel shade and light effects on the surface of the improved colored hard rubber article, it is desirable that the amount of pieces of precured material or the thickness of the knobbed disk shown in Fig. 1, that is, the distance from the top surface of the upper bosses 9 to the lower surface of the lower bosses 10, of the disk 7, as indicated in Fig. 2, be such that the bosses would be stretched or squeezed laterally at least 100% of the diameter of about their middle horizontal plane. It will be understood in this connection that unless there is a substantial stretching or lateral expansion of the portions of the precured material the most highly desired effects on the surface of the finished article will not be produced. Satisfactory effects have been produced by stretching or distorting the portions of precured material in contact with the interior surfaces of the mold from about 25% to about 75%. But for the best results a stretching or distortion of the portions of the precured material in contact with the surfaces of the mold should be from about 75% to 100% and over, preferably at least 100% and over.

The molding of the precured colored hard rubber composition into final form, whether from separate pieces or from a plain single piece or from a single piece with protuberances, is preferably accomplished by placing the mold with the precured material therein under pressure in the steam press at a temperature of about 360° F. and kept therein from about 15 to about 30 minutes in order to effect, first, the softening of the precured material so that it can be forced readily by the pressure of the mold parts thereon into all the interstices or cavities of the mold structure, and then the final vulcanization of the hard rubber composition. The pressure and heat on the precured rubber composition causes the separate pieces of the composition and the lateral edges or sides of the bosses of the intermediate product shown in Fig. 1 to stretch and run together and coalesce with one another, so that when the vulcanization has been performed, the hard rubber composition filling the mold cavity is converted into a unitary self-sustaining article. The first effect of the heat in the mold on the hard rubber composition, as stated, is to soften the composition somewhat so that the parts thereof, will stretch or squeeze out more easily and fill completely the interstices or cavities of the mold, and yet without totally destroying or eliminating the shape of the individual pieces or of the bosses or protuberances on the sheet, so that the separate pieces or the bosses and the binders between them will still be visible in the completed article, as shown in Fig. 5.

Under the influence of the heat in the press and the pressure exerted by the mold parts the separate pieces at the points at which they contact with each other and the spaced bosses or protuberances 8 on the disk 7 are caused to unite and vulcanize to each other. The fact that the individual pieces have been cut from a sheet which had been preliminarily vulcanized and the fact that the bosses or protuberances 8 form part of a sheet or disk 7 which had been vulcanized, results in those portions of the pieces and of the bosses in contact with the inner surface of the mold retaining substantially their individual identity although they are squeezed out or stretched and portions of other pieces or parts of the disk or sheet 7 may be squeezed between portions of the pieces and of the bosses 8 in contact with the inner surfaces of the mold. Hence it is possible to produce substantially any predetermined arrangement and shape of the areas on the surface of the improved colored hard rubber article. In this connection it will be understood that the squeezed out or laterally expanded bosses or protuberances 8 of the disk or sheet 7, or the individual pieces where separate pieces are employed to produce the completed article, constitute distinct areas on the surface of the colored hard rubber article, as indicated by any of the areas 12 on Fig. 5, although the bosses or the separate pieces are firmly united together into a unitary whole. It will be understood further that the stretching or squeezing of individual spaced pieces or of the spaced bosses together under the pressure exerted by the mold parts on them does not result in a regular mosaic-like pattern, since under the softening action of the heat in the press and the pressure of the mold on the composition results in forcing up portions of other individual pieces between the pieces in contact with the inner surface of the mold or portions of the disk 7 between the portions of the bosses 8 in contact with the inner surfaces of the mold. However, when it is desired to produce a regular mosaic-like outer surface on a colored hard rubber article according to the invention, individual pieces may be placed carefully in the mold in a pre-arranged condition, and the exterior surface of the molded article will present areas corresponding substantially to the position in which the pieces were originally placed in the mold.

Assuming that it is desired to produce an article like the tray shown in Fig. 4 from the intermediate product shown in Fig. 1, this material is placed in the cavity 14 of the lower mold section indicated at 15 in Fig. 2, and then the upper or male section 16 of the mold is brought down onto the upper surface of the upper bosses 9 of the disk 7, it being assumed that the mold, which is shown only diagrammatically, is provided with the usual pressure means for forcing the two mold sections toward each other to squeeze and stretch the hard rubber composition sufficiently to completely fill the mold cavity, which occurs, as indicated at 17 in Fig. 3, while the rubber composition is still in moldable condition.

A molded hard rubber article of yellow color having a highly attractive surface simulating in light effects that of the surface of mother-of-pearl may be produced from a composition of the following formula:

| | Parts by weight |
|---|---|
| Rubber | 58.0 |
| Sulphur | 22.0 |
| Linseed oil | .2 |
| Magnesia | .2 |
| Zinc oxide | 3.0 |
| Altax (an accelerator) | .6 |
| Arsenic trisulphide | 16.0 |

These ingredients are mixed together in the usual manner in a rubber mill and then calendered. If it is desired to produce a more or less perfect mosaic on the surface of the hard rubber article, such as a tray, as shown in Fig. 4, the embossed disk shown in Fig. 1 will first be molded and then be precured in the mold, it being understood that the bosses or protuberances 8 of the disk 7 will produce a substantially regular mosaic effect or pattern, such as that shown in Fig. 5, which is a drawing of a photograph of a section of the surface of a serving tray made from the embossed disk shown in Fig. 1.

If, however, it is desired to produce on the surface of the hard rubber article an irregular effect, the ingredients after being mixed together in the mill, are calendered to sheets of about one-eighth to one-fourth of an inch in thickness, placed between sheets of tin, and then preliminarily vulcanized by placing the sheets in a tank of water enclosed in a steam chamber and heated for about ten minutes at from about 50 to 55 pounds steam pressure. The precured sheets are then cut into irregularly shaped pieces of approximately one-half of an inch across and an appropriate amount introduced into a mold of the desired shape, closed under high pressure and then placed in a steam press or vulcanizing chamber for about fifteen to thirty minutes at a temperature of about 360° F. Before removing the article from the mold the latter is cooled down to prevent blistering of the surface of the article.

To produce an article having a reddish color the following formula may be used:—

|  | Parts by weight |
|---|---|
| Smoked sheet | 56.8 |
| Sulphur | 21.6 |
| Linseed oil | .2 |
| Calc. magnesia | .2 |
| Zinc oxide | 2.6 |
| Altax | .6 |
| Arsenic trisulphide | 14.4 |
| 203 Vansul red | 2.0 |

A blue colored article may be poduced by a composition of the following formula:—

|  | Parts by weight |
|---|---|
| Smoked sheet | 52.2 |
| Sulphur | 19.8 |
| Linseed oil | .2 |
| Calc. magnesia | .2 |
| Zinc oxide | 2.6 |
| Altax | .6 |
| Arsenic trisulphide | 14.4 |
| PCD Du Pont blue | 10.0 |

And a green colored article may be produced by using the following formula:—

|  | Parts by weight |
|---|---|
| Smoked sheet | 56.2 |
| Sulphur | 21.2 |
| Linseed oil | .2 |
| Calc. magnesia | .2 |
| Zinc oxide | 3.0 |
| Altax | .6 |
| Arsenic trisulphide | 15.6 |
| PCD Du Pont blue | 3.0 |

If the various areas 12 composing the surface of the novel hard rubber article (only a portion of which is shown in Fig. 5), are carefully observed, it will be seen that they are distinctly separate and individual, although coalesced or bonded together into a unitary whole. At some points, as at 18, the areas 12 are contiguous or directly abut each other. At other points, as at 19, the areas are separated by narrow bands or strips which result from the forcing of the underlying disk 7 up (or down) between the pieces of rubber compound originally in contact with the mold surfaces. Also, there are areas, as at 20, which seem to indicate a squeezing or distorting of the rubber in a diversity of directions, a squeezing together in some directions and stretching in others, of a plurality of the bosses 8 and portions of the disk 7. It will further be observed, by viewing Fig. 5 as a unit, that the parallel lines indicating the directions of stretch of the various areas of the surface of the hard rubber article extend in a great diversity of directions. The result is that the various areas composing the whole surface reflect the light with different degrees of intensity according to the direction of stretch of the areas with relation to the point of view. For example, it is assumed that the observer looks at area 21 from a fixed point and turns the article either in the same plane or into different planes. As the article is turned it will be seen that the area 21 passes through substantially all the gradations of the shade tones of the color of the area. Hence for the first time in the manufacture of hard rubber articles, so far as I am aware, there is produced on the exterior surfaces of the articles, different shades of the color of the articles, the shades varying in intensity according to the point of view. From this it will be appreciated that a hard rubber article (including an arsenic sulphide as a pigment) and having a surface composed of a plurality of distinct areas in different degrees of stretch or distortion, the lines of stretch being in diverse directions, will present a luster or an illusion of depth or translucidity suggesting nacre and resembling the "pearlescent" effects produced on articles composed of the derivatives of rubber and cellulose. Thus an appearance has been effected on the surfaces of colored hard rubber articles heretofore considered by the trade as incapable of attainment.

Although only a specific example of the various phases or ways in which the novel method of producing the new colored, molded hard rubber article has been given, it will be understood that the invention is not to be restricted thereto, but may be variously embodied according to the principle of the disclosure. The invention preferably includes the molding of a novel hard rubber composition in a novel manner. For the most satisfactory and attractive light and shade effects on the surface of the novel hard rubber article, the hard rubber composition should include as a pigment one of the arsenic sulphides, with or without other coloring matter. This novel hard rubber composition should then be preformed to a shape which will require stretching or distorting of the rubber component of the hard rubber compound in order to produce the article in its final molded form. The preliminary or intermediate product may be formed in various ways either as separate pieces of different sizes, as a single substantially smooth whole, or as a unit with separated protuberances on the surface thereof. The intermediate product is then partially vulcanized. It is then placed in the mold designed to give the final shape to the article, then subjected to heat and pressure to cause the precured material to completely fill the mold cavity, and then be vulcanized or set in permanent form with the rubber component of the compound in stretched or distorted condition.

I claim:

1. As an article of manufacture, a molded, vulcanized, colored hard rubber compound containing arsenic sulphide, the surface of which is composed of a plurality of distinguishable areas, said areas presenting different shades of the color of the article depending on the angle from which the article is viewed.

2. As an article of manufacture, a molded, vulcanized colored hard rubber compound containing arsenic sulphide, the surface of which is composed of a plurality of distinguishable areas, the component parts of said areas being in stretched or distorted condition.

3. As an article of manufacture, a molded, colored hard rubber compound containing arsenic sulphide, the surface of which presents distinguishable areas which reflect light with different degrees of intensity depending on the angle from which the article is viewed.

4. The method of producing a colored article from a hard rubber compound containing arsenic sulphide, which comprises preparing an intermediate, partially vulcanized product of a shape different from but of the same volume as the finished article, then molding the partially vulcanized product into final form and vulcanizing it.

5. The method of producing a molded, colored hard rubber article, which comprises preparing a hard rubber compound including arsenic sulphide, shaping the compound into an intermediate product of less surface area than that of the finished article and partially vulcanizing it, then molding the intermediate product into final form by causing the surface thereof to stretch and distort into an area substantially greater than that of the intermediate product, and vulcanizing the article.

6. The method of manufacturing colored hard rubber articles, which comprises forming a hard rubber compound including arsenic sulphide into an intermediate product, partially vulcanizing the product, dividing it into a plurality of pieces, molding the pieces into the finished article and vulcanizing it.

WALTER HIEMANN.